March 15, 1938. D. E. BATESOLE 2,110,864
ANTIFRICTION BEARING
Original Filed March 7, 1935
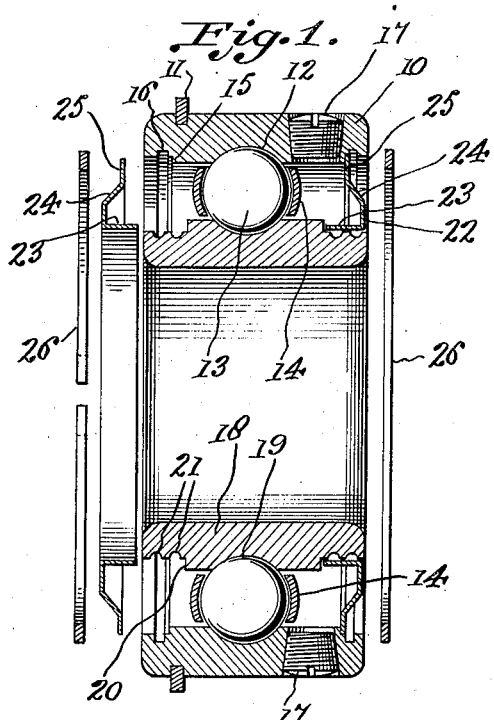
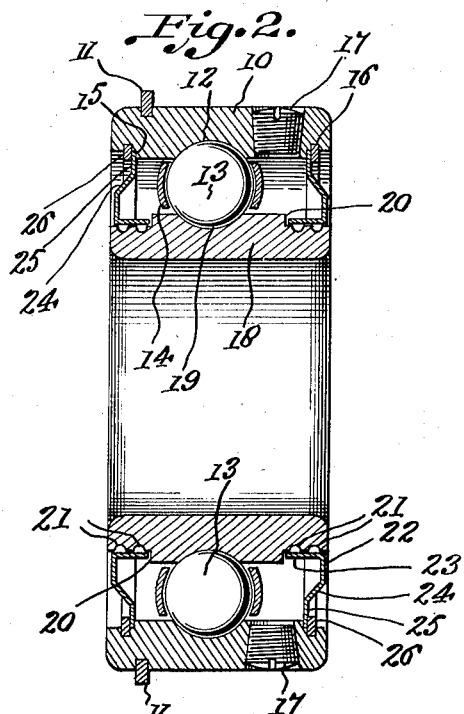
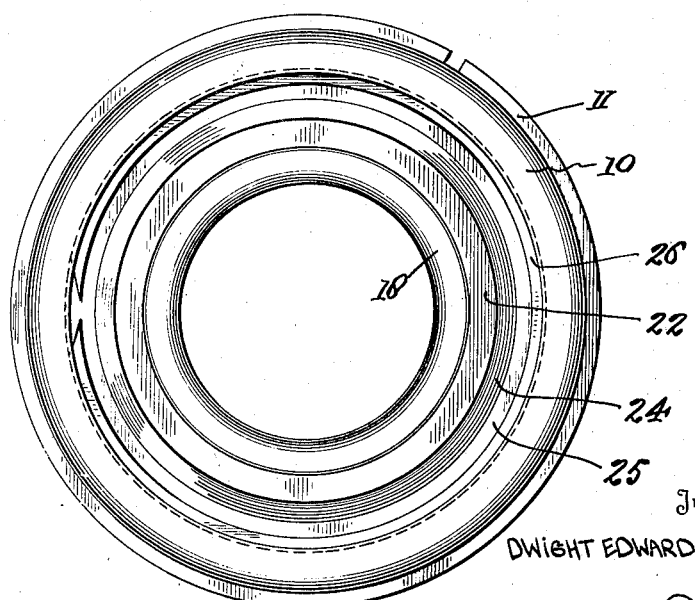
Inventor
DWIGHT EDWARD BATESOLE
By C. P. Goepel
Attorney Patented Mar. 15, 1938

2,110,864

UNITED STATES PATENT OFFICE 2,110,864

ANTIFRICTION BEARING

Dwight Edward Batesole, Glenbrook, Conn., assignor to Norma-Hoffmann Bearings Corporation, Stamford, Conn., a corporation of New York Application March 7, 1935, Serial No. 9,796
Renewed June 11, 1937

3 Claims. (Cl. 308—187.2)

The present invention relates to anti-friction bearings and more particularly to the type known as grease packed bearings.

An object of the present invention is to provide an improved and simplified construction of bearing of this type which may be constructed for small light work, such as in electric motors for operating small devices, and which may be manufactured in a heavier type for use in large motors and the like.

Another object of the invention is to provide a bearing structure which has the advantage of simplicity in mounting, which is self-contained and which is provided with means whereby the bearing may have lubricant added thereto from time to time and where the bearing may be washed out when desired and without removing the bearing from its mounting.

Another object of the invention is to provide a bearing structure of the type which carries a body of grease or lubricant and which is supposed to last throughout the life of the bearing but the present improvements provide means for introducing additional or renewed supplies of the lubricant when it is actually needed for maintaining the efficiency of the bearing.

The invention also provides an improved construction of bearing which has these advantages and which at the same time is provided with easily removed side or end plates admitting free access to the lubricant chambers so that the bearing may be thoroughly cleaned out and a new supply of lubricant added thereto without removing the main portions of the bearing from their mountings so that in servicing the bearing but slight expense and time are consumed.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a sectional view taken through a grease packed bearing constructed according to the present invention and showing certain parts thereof removed for gaining access to the lubricant chamber.

Figure 2 is a similar view showing all of the parts in position, and

Figure 3 is a side elevation of the complete bearing shown in Figure 2.

Referring now to the drawing, the bearing comprises an outer race ring 10 which is of suitable external configuration for adapting the outer race ring to the particular motor or work to which the bearing is to be applied, and an external locking ring 11 may be employed for holding the outer ring 10 in place, the ring 11 being seated in a suitable annular groove or the like as shown.

The outer race ring 10 is provided intermediate its sides with the usual annular raceway 12 in which travel anti-friction bearing elements 13, shown as balls in the present instance, and which may be provided with a suitable cage 14. At opposite sides of the raceway 12 the outer race ring 10 is provided with outwardly facing shoulders or seats 15 and immediately adjacent the seats 15 annular locking grooves 16 are provided which are of greater depth than the seats or shoulders 15. The outer ring 10 is also provided with a threaded opening therethrough having a grease plug 17 therein which is readily removable for the introduction of grease and the like to the interior of the bearing. This plug 17 admits of the flushing out of the bearing, the renewal of the lubricant therein, and the addition of lubricant from time to time to the interior of the bearing.

The bearing is provided with an inner race ring 18 and is provided at its exterior with an annular raceway 19 for receiving therein the said anti-friction bearing elements 13. At opposite sides of the raceway 19, the inner race ring 18 is provided with outwardly facing stop shoulders 20 and outwardly of the shoulders has reduced cylindrical bearing surfaces in the faces of which are provided spaced apart annular lubricant sealing grooves 21 which face the inner side of the outer ring 10.

The grease or other lubricant used is maintained between the race rings 10 and 18 by removable side plates 22 in the form of flat rings provided at their inner marginal edges with inwardly extending base flanges or sleeves 23 adapted to be adjacent to the cylindrical bearing portions of the ring 18 and which overlie and close the exposed sides of the lubricant sealing grooves 21. The inner edges of the base flanges 23 are adjacent to, but do not touch the shoulders 20 so as to limit the clearance space between inner ring 18 and side plates 22. There is a running clearance between the end of the cylindrical portion and the recessed shoulder of the inner ring. The outer marginal portions of the side plates 22 are each provided with an inwardly inclined and substantially radially extending wall 24 which terminates at its outer edge in an annular retaining flange 25 of sufficient diameter to engage in the seat 15 at its respective side of the bearing.

For releasably holding the side plates 22 with their parts in position between the race rings 18 and 10, a snap ring 26 is provided at each side of the bearing and is adapted to expand into the adjacent locking groove 16, and is of sufficient width to overlap the adjacent portion of the retaining flange 25 of the adjacent side plate for holding it effectively to its shoulder 15.

The lubricant sealing grooves 21 are adapted to receive therein lubricant seeping past the shoulders 20 and the lubricant accumulating in the grooves 21 work against the adjacent sleeve or base flange 23 of a side plate and thus provide an effective seal to hold the lubricant from passing out between the race rings 10 and 18.

The base flange or sleeve on each side plate cooperates with the opposite side bearing surfaces of the inner ring 18 so that the latter may freely turn upon the anti-friction elements 13 and without frictional contact with the side plates or parts thereof.

It is also possible by the removal of top and bottom plugs 17, that the contained lubricant may be washed out. It is apparent that grease may be readily introduced into the lubricant cavity of the bearing and that grease may be added from time to time as required to maintain the bearing in the desired working condition. This is readily done by maintaining the lower plug 17 in closed position, and removing the upper plug 17. It is also apparent that by removal of the snap rings 26 the side plates 22 may be withdrawn from the opposite sides of the bearing so that the latter may be thoroughly cleansed or flushed, or inspected and the side plates with the snap rings may be quickly and easily replaced, all without disturbing the mounting of the bearings in their housings.

This structure of bearing admits of a relatively light structure, or a relatively heavy structure depending upon the type of motor or other device or apparatus to which the bearing is applied, and the bearing will have the same advantages in either construction and type of uses.

It is obvious that various changes and modifications may be made in the details of construction and design of the above specifically described embodiment of this invention without departing from the spirit thereof, such changes and modifications being restricted only by the scope of the following claims.

What is claimed is:—

1. A grease packed bearing comprising an outer race ring, an inner race ring, anti-friction bearing elements disposed between the intermediate portions of said rings, removable grease plugs mounted in the outer race ring at one side of the anti-friction bearing elements, said outer race ring having in its inner wall and at the opposite sides outwardly facing seats and annular locking grooves outwardly of and adjacent to said seats, said inner race ring having on its outer wall and at its opposite sides outwardly facing stop shoulders and cylindrical surfaces extending outwardly from said shoulders with annular lubricant sealing grooves therein, a side plate disposed in each side of the bearing and comprising a substantially flat ring having an inwardly extending annular base flange providing a sleeve removably fitting over the adjacent bearing portion of the inner race ring and adapted to clear the adjacent shoulder, said base flange of the side plate adapted to close said lubricant sealing grooves and retain lubricant therein seeping past the stop shoulder, said side plate having at its outer marginal portion an inwardly inclined wall terminating in a retaining flange removably seating against said seat of the outer race ring, and a snap ring detachably engaging in the locking groove of the outer race ring and having a width sufficient to overlap the said retaining flange of the side plate to detachably secure the latter to the outer race ring.

2. In a grease packed bearing having an outer race ring, an inner race ring and anti-friction bearing elements disposed between the intermediate portions of said rings, said inner race ring having an outwardly facing stop shoulder on the outer wall thereof, and cylindrical surfaces extending outwardly from said shoulder with a plurality of annular lubricant sealing grooves therein, a side plate comprising a ring having an inwardly extending annular base flange providing a sleeve removably fitting over the adjacent cylindrical surface of the inner race ring and having its end in proximity to the shoulder adapted to clear the same and extending over and adapted to close said lubricant sealing grooves, and means for holding said side plate to the outer race ring.

3. A grease packed bearing comprising outer and inner rings, anti-friction bearing elements disposed between said rings, said inner race ring having in its outer surface and at opposite sides spaced sealing grooves adapted to receive lubricant therein, said outer race ring having at its inner surface and at opposite sides outwardly facing seats and locking grooves outwardly of and adjacent to said seats, side plates of flat ring form disposed in the opposite sides of the bearing between said race rings, each side plate having at its inner edge an inwardly extending sleeve for receiving therein the side portion of the inner ring and engaging over said sealing grooves for cooperation therewith to seal the space between the rings, and snap rings disposed in opposite sides of the bearing and engaging in said locking grooves and being of sufficient width to overlap the outer edges of the side plates engaging said seats to hold the side plates in the bearing.

DWIGHT EDWARD BATESOLE.